Figure 1:
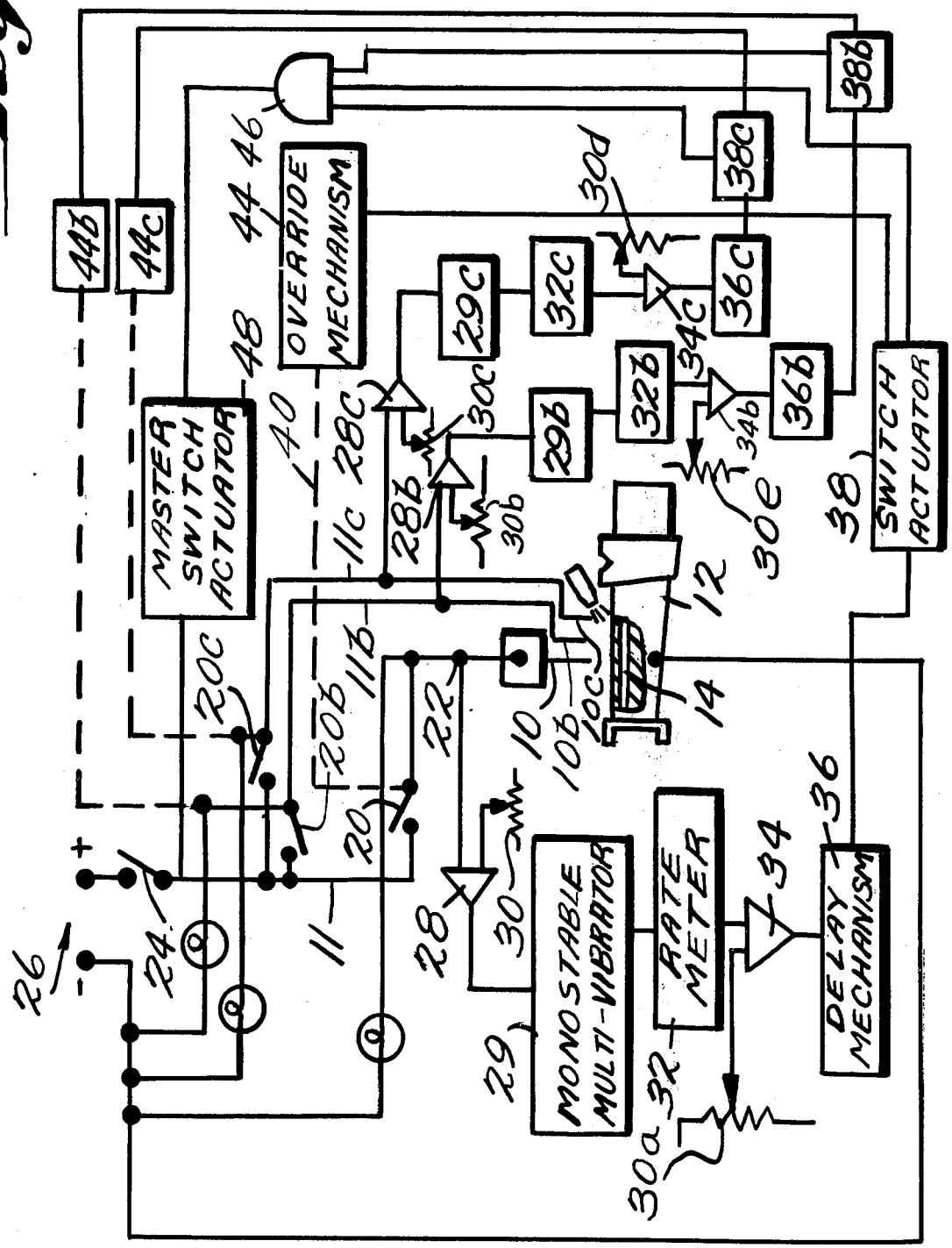

United States Patent [19]

Dinsdale et al.

[11] 4,146,770
[45] Mar. 27, 1979

[54] METHOD FOR CONTROLLING AN ELECTRO-DISCHARGE MACHINE TOOL

[75] Inventors: Raymond Dinsdale, Nelson; Sydney Aveyard, Skipton, both of England

[73] Assignee: Rolls-Royce Limited, London, England

[21] Appl. No.: 785,247

[22] Filed: Apr. 6, 1977

[30] Foreign Application Priority Data

Apr. 15, 1976 [GB] United Kingdom ............... 15444/76

[51] Int. Cl.² .............................................. B23P 1/08
[52] U.S. Cl. ............................. 219/69 M; 219/69 C
[58] Field of Search ................ 219/69 M, 69 C, 69 G, 219/69 S, 69 E

[56] References Cited

U.S. PATENT DOCUMENTS

| | | | |
|---|---|---|---|
| 3,816,692 | 6/1974 | Ratmansky | 219/69 C |
| 3,864,541 | 2/1975 | Inoue | 219/69 C |
| 3,995,134 | 11/1976 | Dudden | 219/69 E |

Primary Examiner—Bruce A. Reynolds
Attorney, Agent, or Firm—Cushman, Darby & Cushman

[57] ABSTRACT

The spark rate across electro-discharge machine tool electrodes and workpiece, is counted and compared with a given pulse output from a reference source. A constant ratio of spark pulses to reference pulses indicates a stable machining operation. Variation in the ratio indicates breakthrough of the electrode, into e.g. a passage in the workpiece. A signal is derived from the ratio variation and is utilized to operate a switch to cut off power to the electrode. The invention is particularly useful where a bank of electrodes machine a row of holes into a passage, for it may be that some electrodes break through before others, making it possible for them to machine the back wall of the passage if power is not cut off.

7 Claims, 1 Drawing Figure

METHOD FOR CONTROLLING AN ELECTRO-DISCHARGE MACHINE TOOL

This invention concerns a method of and apparatus for controlling an electro-discharge machine tool.

Electro-discharge machine tools are used for producing holes in workpieces, which holes can be e.g. as small as 0.010" diameter. The technique is well known but nevertheless suffers drawbacks, particularly where many holes are required to be produced in a workpiece such that after passing through a workpiece thickness they meet with further holes already in the workpiece, for it has proved difficult to detect precisely when breakthrough of the machine tool electrode has occurred which detection is necessary to that the electrode power supply can be cut off before the electrode strikes the back wall of the further hole. Indeed, it has proved impossible, until now, where several holes have been drilled simultaneously with a number of respective electrodes arranged in a bank, at least with any degree of reliability or selectivity. In consequence, the electrode or electrodes which break through and which still have electrical power applied thereto, collide with the back wall of the hole or passage into which it or they have broken whereupon the back wall is unintentionally machined with the further consequence of scrapping of the workpiece.

Apparatus which has been utilised for the purpose of detecting breakthrough of the electrode into a passage on a workpiece includes:

(a) electronic ears to monitor increase in drilling noise in the passage. This is non-selective and requires sufficient space for access for equipment, (b) photo-electric cells to intercept the light given off by machining sparks as the electrodes break through. Separate means for each electrode are necessary which again requires respective light carrying means for each electrode and access space within the passage, (c) an insulated strip which is contacted by the electrodes as they break through. Again access space is required.

The problem to be solved therefore was how to detect breakthrough of an electrode into a passage in a workpiece on an electro-discharge machine tool and then control the operation of that electrode so as not to damage the passage wall. Thus, there has been devised the present invention which comprises a method of controlling an electro-discharge machine tool including the steps of introducing a reference voltage and an associated reference voltage monitoring station into the machine tool control system and in operation, comparing the rate of electrical discharge between an at least one machining electrode and its complementary workpiece electrode, with the output reference voltage at said associated reference voltage monitoring station and when the ratio of discharge rate to reference voltage output varies, deriving a first signal impulse form from said variation and utilising it to switch off electric current to said at least one machining electrode.

The invention also includes apparatus for putting the method into effect and comprises in combination first means for monitoring the electrodischarge rate of an electro-discharge machine tool electrode and for monitoring a reference voltage output rate, which means is adapted to compare both rates and should the ratio of said rates vary, derive a signal therefrom and emit said signal and machine tool electrode switch actuating means adapted so that in operation of a said machine tool, said switch actuating means is acted upon if said signal is generated and thereafter actuates a switch to electrically isolate an associated electrode.

The invention will now be described, by way of example and with reference to the accompanying drawing which is a diagrammatic view of the apparatus in accordance with the invention.

In the drawing an electro-discharge machine tool electrode 10 and a workpiece 12, in this example, a turbine blade, are electrically connected to a power source via a power line 11, for the purpose of electro-discharge machining a hole in the workpiece edge in a known manner and which hole on completion, will join with a passage 14 in the workpiece.

A switch 20 is provided between electrode 10 and the junction 22 of power input line 11 so that contact between electrode 10 and the power supply may be broken on completion of drilling of a hole. A further, master switch 24 is provided in the power input line 11, between the input connection 26 to the supply and junction 22, for reasons which will be explained later in this specification.

Whilst power is being supplied to both electrode 10 and workpiece 12, electrical discharge will occur in an intermittent manner across the gap therebetween. However, as electrode 10 breaks through the wall of the blade into passage 14, its discharge rate will fall off owing to the space between it and the workpiece increasing, thus increasing the resistance to the current bridging the gap.

In order to ascertain when the electrode 10 has broken through into passage 14 and thus know when to disconnect the electrode from the supply so as to prevent inadvertent machining of the passage wall opposite the point of breakthrough of the electrode, a device is provided which comprises a comparator 28 which is connected to receive signals corresponding to the voltage pulses generated at electrode 10, and compare them with the output of a preset reference voltage 30. Thus each excursion of the voltage at electrode 10 through the preset level, such as occurs each time a machining spark is generated, results in the production in comparator 28 of a pulse for each spark so generated. The pulses are passed to a monostable multi-vibrator 29 which in turn emits a rectangular pulse of fixed length for each pulse received from comparator 28. The fixed length pulses are then passed to a rate meter 32 which gives a voltage output proportional to pulse input frequency. The rate meter output is then channelled to a further comparator 34 which simultaneously receives signals generated by a further reference voltage 30a.

Comparator 34 is arranged to emit a signal only when the voltage output of rate meter 32 falls below the value of reference voltage 30a. the level of which has been determined by first drilling a hole in a corresponding workpiece material and assessing the sparking rate fall off as the electrode drill breaks through a sufficient distance to ensure producing a hole which has parallel walls for its full length. When comparator 34 has been activated, the resultant signal therefrom is transmitted to a switch actuator 38 via a delay mechanism 36 which prevents the actuator from actuating switch 20 for a given period of time which is fixed by the spark fall off rate assessments mentioned hereinbefore. Once that period of time has elapsed, the switch actuator actuates switch 20 to break electrical contact between electrode 10 and the power supply and, machining of workpiece 12 having finished, electrode 10 is withdrawn from the hole it has produced.

An override mechanism 44 is provided, to override any tendency for power to be cut off in the initial stages of machining, for reasons explained later in this specification.

In the single machining electrode set-up as described so far in this specification, switch 20 may be obviated and line 40 taken directly to switch 24. However, as described the apparatus is easily adapted to accommodate a plurality of electrodes such as electrodes 10b, 10c all of which could simultaneously machine the same workpiece 12 to provide a row of holes therein, or respective individual workpieces as desired, in which case master switch 24 will be needed along with switch 20 and a number of other switches which would correspond to switch 20 and the number of electrodes 10, 10b, 10c etc. so as to be utilised as explained hereinafter.

The drawing shows in block form the complete circuit for a single electrode 10 and the circuitry for associated electrodes 10b, 10c.

The circuitry for electrode 10b includes parts corresponding to the parts in the circuitry of electrode 10. Thus, electrode 10b has associated with it a comparator 28b and reference voltage 30b, a monostable multivibrator 29b, a rate meter 32b, a further comparator 34b and reference voltage 30e, a delay mechanism 36b and a switch actuator 38b. Similarly, electrode 10c includes corresponding parts in its circuit, which parts have numbers, identical with the corresponding parts in the circuit of electrode 10 but include the letters c or d.

Where several electrodes are being simultaneously used to produce a row of holes, two more devices are needed in addition to those described, over and above the single electrode system. The first comprises, for each electrode circuit override mechanisms 44b, 44c corresponding to override mechanism 44 which prevents the possibility of any of the circuits being cut out at the start of a machining operation, which event might occur for any of the following reasons. Without the mechanism and because of such factors as e.g. uneven workpiece surface, unequal electrode length, the initial machining action may be somewhat erratic. In that event, the result would be that one or more circuits might indicate a spark voltage to reference voltage output ratio in that range at which the switches are arranged to cut out those circuits. Accordingly the mechanism 44 is designed to override the outputs of the respective comparators 34 for a given period e.g. the first half of the time taken to complete drilling of the holes.

The second device is one common to all in a multi-electrode arrangement and comprises an AND gate 46 which is connected to receive a signal from the electrodes which are cut out on the drilling of their associated hole finishing and when the AND gate reaches a cut out signal total corresponding to the number of electrodes being simultaneously used, a signal is generated thereby and passed to a master switch actuator 48 which causes the master switch 24 to break contact between power supply and the apparatus as a whole.

The main advantage accruing from this invention is that where a number of electrodes are used simultaneously, those electrodes which break through first, have their respective power supplies cut off before they strike the back wall of the passage, thus avoiding machining of the back wall, though scratching may occur, depending upon the relative hardness of electrode and workpiece. Because all electrodes are traversed as a group, the last electrode to break through into the passage, is the one which dictates when the group of electrodes should be retracted.

Experiments utilising the invention have been successfully carried out with a group of twenty electrodes simultaneously machining holes in one workpiece and it was found useful to provide simple visual indication of when each electrode became electrically isolated on completion of its task, by means of lamps (not shown) connected one in each electrode circuit, the arrangement being such that as each circuit became electrically disconnected, its associated lamp went out.

We claim:

1. A method of controlling an electro-discharge drilling machine tool, on break out from a workpiece, of its associated machining electrode including the steps of electrically connecting a rate meter into the machining circuit and extracting from the rate meter, a voltage output the amplitude of which is representative of the machining voltage pulse frequency, comparing said amplitude with a reference voltage and if the rate meter voltage amplitude falls below said reference voltage, deriving a signal therefrom and directing said signal to power switch off means, so as to switch off electrical power to the machining electrode of the electro-discharge machine tool.

2. A method of controlling an electro-discharge drilling machine tool as claimed in claim 1 including the step of directing the signal so derived, to the power switch off means via override means which is arranged to override any said derived signal which is derived during the initial stages of machining, as a result of anomalies in machining conditions adversely affecting the rate meter voltage amplitude.

3. A method of controlling an electro-discharge machine tool as claimed in claim 2 including the step of passing that derived signal which is not overridden, through a delay mechanism so as to delay its effect on said switch off means, the period of delay being sufficient to insure completion of break out of said electrode.

4. A method of controlling an electro-discharge drilling machine tool which has a plurality of machining electrodes, including the steps of connecting respective rate meters into the machining circuit of each electrode and extracting from each respective rate meter, a voltage output the amplitude of which is representative of the machining voltage pulse frequency across the respective electrodes and workpiece, comparing said amplitudes with associated reference voltages and if any of the compared rate meter volatage amplitudes falls below its respective reference voltage, deriving a signal therefrom and directing said signal to respective power switch off means, so as to switch off electrical power to the respective electrode of the electro-discharge machine tool, the machining pulse rate of which has brought about said fall.

5. A method of controlling an electro-discharge drilling machine tool as claimed in claim 4, including the step of directing any signals so derived to the respective power switch off means via respective override means, each of which is arranged to override signals derived during initial stages of machining, as a result of anomalies in machining conditions adversely affecting the voltage amplitude of any of the rate meters.

6. A method of controlling an electro-discharge drilling machine tool as claimed in claim 5 including the step of passing those derived signals which are not overridden, through a delay mechanism so as to delay their effect on said respective switch off means, the period of delay being sufficient to insure completion of break out of said respective electrodes.

7. A method of controlling an electro-discharge drilling machine tool as claimed in claim 6, including the step of visually indicating electrical disconnection of each electrode by connecting respective lamps into the machine tool electrical circuit such that during machining of a workpiece, those electrodes in operation have an associated lamp lit and those electrodes which are electrically disconnected have their respective, associated lamp unlit.

* * * * *